(12) United States Patent
Zhang et al.

(10) Patent No.: US 11,314,988 B2
(45) Date of Patent: Apr. 26, 2022

(54) IMAGE AESTHETIC PROCESSING METHOD AND ELECTRONIC DEVICE

(71) Applicant: HUAWEI TECHNOLOGIES CO., LTD., Guangdong (CN)

(72) Inventors: Qing Zhang, Beijing (CN); Miao Xie, Shenzhen (CN); Shangling Jui, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 73 days.

(21) Appl. No.: 16/771,063

(22) PCT Filed: Mar. 26, 2018

(86) PCT No.: PCT/CN2018/080533
§ 371 (c)(1),
(2) Date: Jun. 9, 2020

(87) PCT Pub. No.: WO2019/114147
PCT Pub. Date: Jun. 20, 2019

(65) Prior Publication Data
US 2021/0182613 A1    Jun. 17, 2021

(30) Foreign Application Priority Data
Dec. 15, 2017   (CN) .......................... 201711351283.4

(51) Int. Cl.
*G06K 9/62* (2006.01)
*G06N 3/04* (2006.01)
(Continued)

(52) U.S. Cl.
CPC ......... *G06K 9/6257* (2013.01); *G06K 9/6262* (2013.01); *G06K 9/6267* (2013.01);
(Continued)

(58) Field of Classification Search
CPC . H04L 63/0823; H04L 63/083; H04L 67/141; H04W 12/068; H04W 12/069;
(Continued)

(56) References Cited

U.S. PATENT DOCUMENTS

| | | | |
|---|---|---|---|
| 9,659,384 B2 | 5/2017 | Shaji et al. | |
| 2016/0098844 A1* | 4/2016 | Shaji ......................... | G06T 9/00 |
| | | | 382/156 |

(Continued)

FOREIGN PATENT DOCUMENTS

| | | |
|---|---|---|
| CN | 104333707 A | 2/2015 |
| CN | 105787510 A | 7/2016 |

(Continued)

OTHER PUBLICATIONS

Shu Kong et al., "Photo Aesthetics Ranking Network with Attributes and Content Adaptation",dated Jul. 27, 2016,total 24 pages.

(Continued)

*Primary Examiner* — Xin Jia
(74) *Attorney, Agent, or Firm* — Westerman, Hattori, Daniels & Adrian, LLP

(57) ABSTRACT

This application provides an image aesthetic processing method and an electronic device. A method for generating an image aesthetic scoring model includes: constructing a first neural network based on a preset convolutional structure set; obtaining an image classification neural network, where the image classification neural network is used to classify image scenarios; obtaining a second neural network based on the first neural network and the image classification neural network, where the second neural network is a neural network containing scenario information; and determining an image aesthetic scoring model based on the second neural network, where output information of the image aesthetic scoring model includes image scenario classification infor- (Continued)

mation. In this method, scenario information is integrated into a backbone neural network, so that a resulting image aesthetic scoring model is interpretable. In addition, scoring accuracy of the image aesthetic scoring model can be improved by using the preset convolutional structure set.

18 Claims, 11 Drawing Sheets

(51) Int. Cl.
*G06N 3/08* (2006.01)
*G06T 7/00* (2017.01)

(52) U.S. Cl.
CPC ............ *G06N 3/0454* (2013.01); *G06N 3/08* (2013.01); *G06T 7/0002* (2013.01); *G06T 2207/20081* (2013.01); *G06T 2207/20084* (2013.01); *G06T 2207/30168* (2013.01)

(58) Field of Classification Search
CPC ...... H04W 4/50; H04W 4/60; G06K 9/00664; G06K 9/6257; G06K 9/6262; G06K 9/6267; G06K 9/6273; G06N 3/0454; G06N 3/08; G06T 2207/20081; G06T 2207/20084; G06T 2207/30168; G06T 7/0002

See application file for complete search history.

(56) References Cited

U.S. PATENT DOCUMENTS

2017/0347259 A1* 11/2017 Kwak .................. H04M 17/02
2019/0147305 A1* 5/2019 Lu ........................ G06F 16/583
382/157

FOREIGN PATENT DOCUMENTS

| CN | 107153838 A | 9/2017 |
| CN | 107169586 A | 9/2017 |
| CN | 105528757 B | 1/2019 |

OTHER PUBLICATIONS

Anonymous,"Your phone is the best camera",dated Aug. 30, 2017,total 8 pages.
International Search Report dated Sep. 4, 2018, issued in counterpart Application No. PCT/CN2018/080533, with English translation. (11 pages).

* cited by examiner

IMAGE AESTHETIC PROCESSING METHOD AND ELECTRONIC DEVICE

CROSS-REFERENCE TO RELATED APPLICATIONS

This application is a National Stage of International Patent Application No. PCT/CN2018/080533, filed on Mar. 26, 2018, which claims priority to Chinese Patent Application No. 201711351283.4, filed on Dec. 15, 2017. Both of the aforementioned applications are hereby incorporated by reference in their entireties.

TECHNICAL FIELD

This application relates to computer technologies, and in particular, to an image aesthetic processing method and an electronic device.

BACKGROUND

Image aesthetic appeal refers to aesthetic feelings of people when viewing images. In aesthetic appeal evaluation, human perception is stimulated on a computer to determine aesthetic appeal of images, and classify the aesthetic appeal of images, or score the aesthetic appeal of images.

In the prior art, a depth model-based image aesthetic scoring method is proposed. In this method, a characteristic of an image is obtained through learning based on a fixed neural network, and then a corresponding aesthetic score is assigned to the image based on the characteristic of the image.

However, an image aesthetic scoring result cannot be interpreted in the existing method.

SUMMARY

This application provides an image aesthetic processing method and an electronic device, to resolve a prior-art problem that an image aesthetic scoring result cannot be interpreted.

A first aspect of this application provides a method for generating an image aesthetic scoring model, where the method includes:

constructing a first neural network based on a preset convolutional structure set;

obtaining an image classification neural network, where the image classification neural network is used to classify image scenarios;

obtaining a second neural network based on the first neural network and the image classification neural network, where the second neural network is a neural network containing scenario information; and determining an image aesthetic scoring model based on the second neural network, where output information of the image aesthetic scoring model includes image scenario classification information.

In this method, scenario information is integrated into a backbone neural network, so that a resulting image aesthetic scoring model is interpretable. In addition, scoring accuracy of the image aesthetic scoring model can be improved by using the preset convolutional structure set.

In a possible design, the image aesthetic scoring model is applied to an electronic device, the electronic device includes a dual execution environment, and the image aesthetic scoring model runs in a trusted execution environment of the dual execution environment.

In a possible design, the first neural network is concatenated with the image classification neural network, to obtain the second neural network.

In a possible design, parameter sharing is performed between the first neural network and the image classification neural network, to obtain the second neural network.

The image classification neural network is added, so that the finally obtained image aesthetic scoring model can interpret scenario information, such as scenario matching, color balance, lighting suitability, and content prominence, making an image scoring result interpretable and greatly improving user experience.

In a possible design, a third neural network obtaining process is as follows:

adding a loss function calculation layer to the second neural network, to obtain a third neural network;

training the third neural network based on a preset training data set, to determine weight information of the third neural network; and validating the third neural network based on a preset validation data set, to determine the image aesthetic scoring model.

In a possible design, the loss function calculation layer includes a plurality of classifiers, each classifier corresponds to a score, and the classifier is used to determine a relationship between an image score and the score corresponding to the classifier.

In a possible design, loss functions at the loss calculation layer are a cross-entropy loss function and a class center loss function.

Several independent one-to-many classifiers are integrated in one image scoring process by setting an order-based loss function, thereby improving system robustness.

In a possible design, the training the third neural network based on a preset training data set, to determine weight information of the third neural network may specifically include:

training the third neural network based on a first training data set, to determine the weight information of the third neural network, where the first training data set includes a plurality of images, and each image includes score information; and/or training the third neural network based on a second training data set, to determine the weight information of the third neural network, where the second training data set includes a plurality of images, and each image includes score ranking information of the image in the second training data set.

The third neural network is trained in a single image training mode and/or a batch image training mode. This can improve accuracy of the model. In addition, only score ranking information rather than image score information needs to be labeled for training images used in the batch image training mode. Complexity of labeling the score ranking information is lower. Therefore, the batch image training mode can significantly lower a requirement on training data for model training, thereby effectively expanding a training data set.

In a possible design, the training the third neural network based on a first training data set may specifically include:

inputting the images in the first training data set into the third neural network one by one, to train the third neural network.

In a possible design, the training the third neural network based on a second training data set, to determine the weight information of the third neural network may specifically include:

dividing the images in the second training data set into a plurality of image pairs, and inputting two images in each image pair into the third neural network and a neural network replicated from the third neural network, respectively; and performing loss calculation based on scores and score ranking information of the two images, to determine the weight information of the third neural network.

In a possible design, the training the third neural network based on a second training data set, to determine the weight information of the third neural network may specifically include:

dividing the images in the second training data set into a plurality of subsets, and inputting an image in each subset into the third neural network, to obtain score information; and determining, based on the score information, the weight information of the third neural network by using a loss function based on statistical probability distribution through gradient descent backpropagation.

In a possible design, after the validating the third neural network based on a preset validation data set, the method further includes:

constructing, by using a preset traversal algorithm, a new first neural network based on an indicator value obtained after validation.

A convolutional structure is adjusted by using the foregoing preset convolution type library and the traversal algorithm. This can effectively increase scoring accuracy of a model, and flexibly evaluate an actual effect of different combinations of convolution kernels and convolutions on aesthetic scoring.

A second aspect of this application provides an image score downgrade processing method, where the method includes:

obtaining a target scoring model based on a preset image aesthetic scoring model, at least one preset quality discrimination model, and a preset downgrade policy; and performing score downgrade processing on an image based on the target scoring model.

In this method, image score downgrade processing is integrated into an image aesthetic scoring model. The downgrade processing makes an aesthetic scoring result much more sensitive to a low-quality factor of concern in a specific application scenario.

In a possible design, the obtaining a target scoring model based on a preset image aesthetic scoring model, at least one preset quality discrimination model, and a preset downgrade policy specifically includes:

integrating the image aesthetic scoring model with the at least one quality discrimination model, and performing downgrade processing on an output of an integrated model by using the preset downgrade policy, to obtain the target scoring model.

In a possible design, the downgrade policy includes at least one of the following:

a first downgrade policy, where in the first downgrade policy, there is a first preset correspondence between a low-quality factor affecting an image score and the image score;

a second downgrade policy, where in the second downgrade policy, there is a second preset correspondence between a low-quality factor affecting an image score and an image score decrease proportion; and a third downgrade policy, where in the third downgrade policy, a low-quality image is used as training data to obtain a downgrade function between the image aesthetic scoring model and the quality discrimination model.

In a possible design, the target scoring model is applied to an electronic device, the electronic device includes a dual execution environment, and the image aesthetic scoring model runs in a trusted execution environment of the dual execution environment.

A third aspect of this application provides an image re-ordering method, where the method includes:

obtaining a to-be-ordered image set, where each image in the to-be-ordered image set includes score information; and ordering the to-be-ordered image set based on a preset re-ordering model, to obtain an ordered image set, where the re-ordering model is constructed based on a reinforcement learning framework, the re-ordering model is used to feed back feature information of a user, and the reinforcement learning framework includes a state and a reward.

In a possible design, before the obtaining a to-be-ordered image set, the method further includes:

training the re-ordering model based on user information and the score information, where the user information is obtained based on a user operation, and the user operation includes operation content, an operation sequence, and operation time.

In this method, scoring results of an existing image aesthetic scoring model are re-ordered, so that an ordering result better reflects personalized information of a user. Re-ordering is based on a reinforcement learning framework. As a result, user feedback information can be considered more flexibly to perform adaptive learning to adjust the ordering result.

In a possible design, the method is applied to an electronic device, the electronic device includes a dual execution environment, and the image aesthetic scoring model runs in a trusted execution environment of the dual execution environment.

In the foregoing architecture, an output aesthetic scoring model, a target scoring model for downgrade processing, and an image re-orderer can be implemented through a security mechanism provided in a security domain. In an electronic device, the aesthetic scoring model, the target scoring model for downgrade processing, and the image re-orderer provided in this application can run securely through a dual-domain isolation mechanism and a TA and CA authentication policy, without being tampered with. Therefore, security of the aesthetic scoring model, the target scoring model for downgrade processing, and the image re-orderer is ensured.

A fourth aspect of this application provides an electronic device. The electronic device implements the functions in the first aspect. These functions may be implemented by hardware or by executing corresponding software by hardware. The hardware or software includes one or more modules corresponding to the foregoing functions.

In a possible design, the electronic device may include a processing module, and the processing module may perform corresponding functions in the foregoing method, for example, constructing a first neural network based on a preset convolutional structure set; obtaining an image classification neural network, where the image classification neural network is used to classify image scenarios; obtaining a second neural network based on the first neural network and the image classification neural network, where the second neural network is a neural network containing scenario information; and determining an image aesthetic scoring model based on the second neural network, where output information of the image aesthetic scoring model includes image scenario classification information.

A fifth aspect of this application provides an electronic device. The electronic device implements the functions in the second aspect. These functions may be implemented by hardware or by executing corresponding software by hardware. The hardware or software includes one or more modules corresponding to the foregoing functions.

In a possible design, the electronic device may include a processing module, and the processing module may perform corresponding functions in the foregoing method, for example, obtaining a target scoring model based on a preset image aesthetic scoring model, at least one preset quality discrimination model, and a preset downgrade policy; and performing score downgrade processing on an image based on the target scoring model.

A sixth aspect of this application provides an electronic device. The electronic device implements the functions in the third aspect. These functions may be implemented by hardware or by executing corresponding software by hardware. The hardware or software includes one or more modules corresponding to the foregoing functions.

In a possible design, the electronic device may include a processing module, and the processing module may perform corresponding functions in the foregoing method, for example, obtaining a to-be-ordered image set, where each image in the to-be-ordered image set includes score information; and ordering the to-be-ordered image set based on a preset re-ordering model, to obtain an ordered image set.

A seventh aspect of this application provides an electronic device, where the electronic device includes a memory and a processor. The memory is configured to store a program instruction; and the processor is configured to invoke the program instruction in the memory to perform the method in the first aspect.

An eighth aspect of this application provides an electronic device, where the electronic device includes a memory and a processor. The memory is configured to store a program instruction; and the processor is configured to invoke the program instruction in the memory to perform the method in the second aspect.

A ninth aspect of this application provides an electronic device, where the electronic device includes a memory and a processor. The memory is configured to store a program instruction; and the processor is configured to invoke the program instruction in the memory to perform the method in the third aspect.

A tenth aspect of this application provides a computer-readable storage medium, where the computer storage medium stores a computer program, and the computer program includes an instruction for performing the method in the first aspect.

An eleventh aspect of this application provides a computer-readable storage medium, where the computer storage medium stores a computer program, and the computer program includes an instruction for performing the method in the second aspect.

A twelfth aspect of this application provides a computer-readable storage medium, where the computer storage medium stores a computer program, and the computer program includes an instruction for performing the method in the third aspect.

In this application, a backbone neural network is constructed from a convolutional structure set including a plurality of convolutional structures or classic neural networks, and the backbone neural network is concatenated with the pre-constructed image classification neural network including scenario information, to obtain the second neural network, so that an image scoring result is interpretable. Further, the loss function calculation layer is added to the second neural network, to obtain the third neural network. The loss function calculation layer includes a polarity of classifiers, improving system robustness. Further, the third neural network is trained in both the single image training mode and the batch training mode. This can significantly lower a requirement on training data for model training, thereby effectively expanding a data set. Based on an indicator value obtained in each validation, the backbone neural network is continuously adjusted in this application, so that accuracy of the finally obtained aesthetic scoring model is highest through continuous iteration. In this application, further, the target scoring model that supports image downgrade may be generated based on the generated aesthetic scoring model, to implement image downgrade, making an aesthetic scoring result that is obtained by using the method in this application much more sensitive to a low-quality factor. Further, in this application, images with aesthetic scores may also be re-ordered based on user preferences. Specifically, re-ordering is based on a reinforcement learning framework, so that an ordering result better reflects personalized information of a user. When re-ordering is based on a reinforcement learning framework, user feedback information can be considered more flexibly to perform adaptive learning to adjust the ordering result.

DESCRIPTION OF EMBODIMENTS

Figure 1:
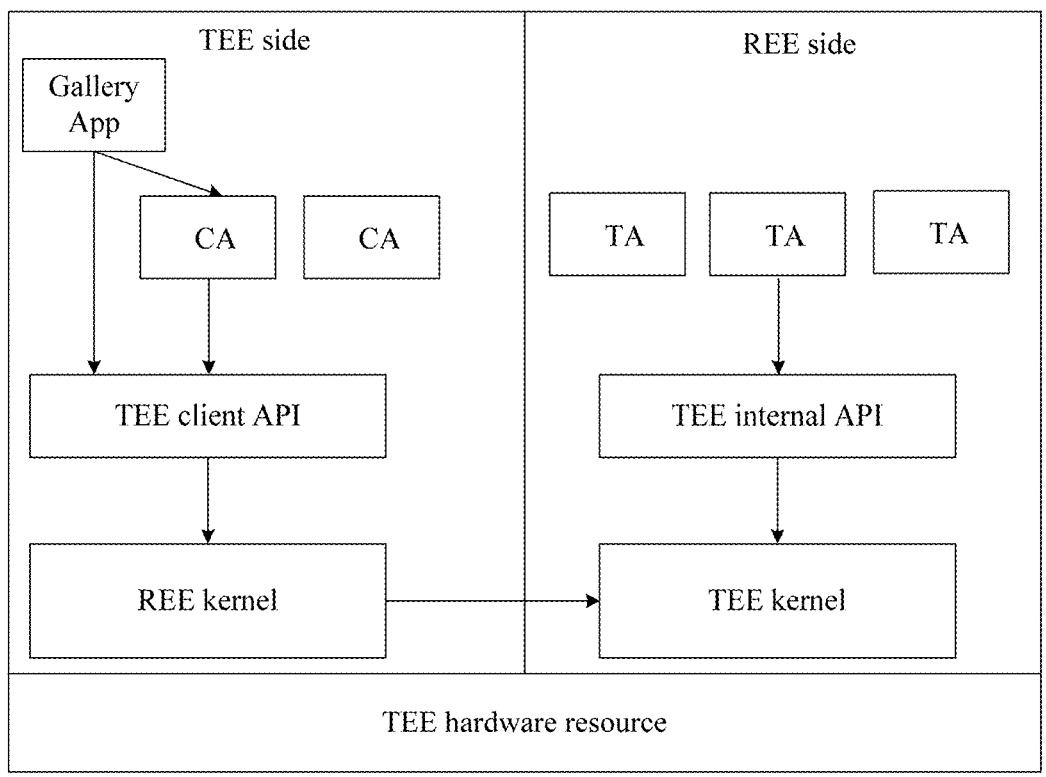
FIG. 1 is a system architecture diagram of an electronic device supporting a dual execution environment.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

To enable those skilled in the art to better understand the technical solutions of this application, the following first describes the technical terms used in this application.

1. Convolutional Neural Network

The convolutional neural network is proposed on a basis of an ordinary artificial neural network. In the artificial neural network, a human brain neuron network is abstracted from a perspective of information processing, to establish a simple model and generate different types of networks based on different connection manners. A difference between the convolutional neural network and the ordinary artificial neural network lies in that a specific convolution layer or the like is added to the convolutional neural network, to perform feature extraction. The convolutional neural network may include three parts: The first part is an input layer, the second part is a combination of a specific quantity of convolution layers and pooling layers, and the third part is a fully connected multilayer perceptron classifier.

It should be noted that the neural networks in the following embodiments of this application all are convolutional neural networks.

2. Convolution Kernel

The convolution kernel is a convolution operation matrix used at a convolution layer to perform a convolution operation.

3. Loss Function

The loss function (Loss Function), namely a target function, is a function that needs to be optimized in the end, and includes an experience loss and a structure loss.

4. Trusted Execution Environment

The trusted execution environment is a secure zone in a main processor of a smartphone, a tablet computer, or any electronic device, and ensures that various sensitive data is stored, processed, and protected in a trusted environment. TEE provides a secure execution environment for authorized security software (also known as a "trusted application"), and ensures end-to-end security by implementing protection, confidentiality, integrity, and data access permission. The trusted execution environment in a mobile terminal such as a smartphone or a tablet computer may be referred to as TEE for short, an abbreviation of "trusted execution environment". In the following embodiments of this application and the accompanying drawings, TEE is used as an example to identify the trusted execution environment.

5. Rich Execution Environment

The rich execution environment (REE) mainly includes a general operating system running on a general-purpose embedded processor and a client application program running on the general operating system.

FIG. 1 is a system architecture diagram of an electronic device supporting a dual execution environment. As shown in FIG. 1, the device supporting the dual execution environment includes a hardware resource supporting TEE. Further, a software system of the electronic device is divided into two independent operating environments through hardware isolation: an REE side and a TEE side shown in FIG. 1. The two operating environments have independent operating memory resources and separate kernel software, and can be dynamically switched through software and hardware during runtime.

Layers on the REE side are an REE kernel, a TEE client application programming interface (TEE Client API), and at least one client application (CA) from bottom to top. The TEE client API is a programming interface invoked by the CA to access a TEE service. The CA is a client application that is running on the REE side and that can invoke the TEE service. In addition, a gallery App shown in FIG. 1 is an example of an App related to image processing. As shown in FIG. 1, the App related to image processing can directly invoke the TEE Client API to implement a function of invoking a TEE service, that is, the App itself may serve as a CA program; or may invoke a CA to implement a function of invoking a TEE service.

Layers on the TEE side are a TEE kernel, a TEE internal application programming interface (TEE Internal API), and at least one trusted application (TA) from bottom to top. The TEE internal API is a programming interface invoked by the TA to access the TEE kernel.

Figure 2:
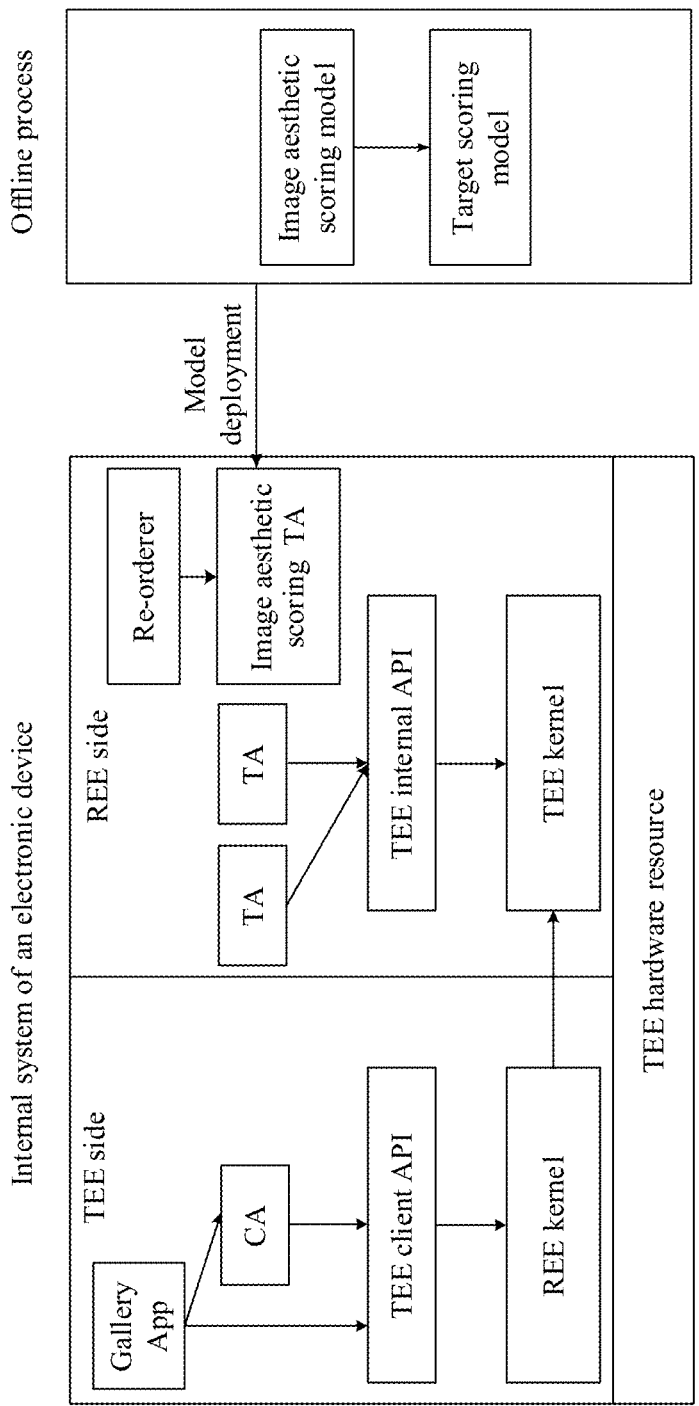
FIG. 2 is a system architecture diagram of an electronic device to which an image aesthetic scoring processing method in this application is applied.

FIG. 2 is a system architecture diagram of an electronic device to which an image aesthetic scoring processing method in this application is applied. As shown in FIG. 2, the following two models may be generated in an offline process, and deployed on an image aesthetic scoring TA in a form of scoring model files: an image aesthetic scoring model generated according to the method for generating an image aesthetic scoring model provided in this application, and a target scoring model for downgrade processing that is obtained based on the image aesthetic scoring model. Further, a gallery App invokes the TA service through a dual isolation mechanism, to complete a task of aesthetically scoring an input image. In addition, a re-orderer generated by using an image re-ordering method provided in this application can be directly deployed in a TEE of an electronic device, and can also invoke the TA service. This application may further use an authentication policy in a dual-domain system to ensure that only an application authenticated in the REE is allowed to access the image aesthetic score TA.

Based on the system architecture shown in FIG. 2, the output aesthetic scoring model, the target scoring model for downgrade processing, and an image re-orderer can be implemented through a security mechanism provided in a security domain. In the electronic device, the aesthetic scoring model, the target scoring model for downgrade processing, and the image re-orderer provided in this application can run securely through a dual-domain isolation mechanism and a TA and CA authentication policy, without being tampered with. Therefore, security of the aesthetic scoring model, the target scoring model for downgrade processing, and the image re-orderer is ensured.

It should be noted that the foregoing electronic device may be a smartphone, a tablet computer, a notebook computer, a desktop computer, or the like. This is not limited in this application.

The following first describes execution steps of the method provided in this application, then describes an execution process of this application with reference to a specific example, and finally describes application of this application in an actual image processing scenario.

Figure 3:
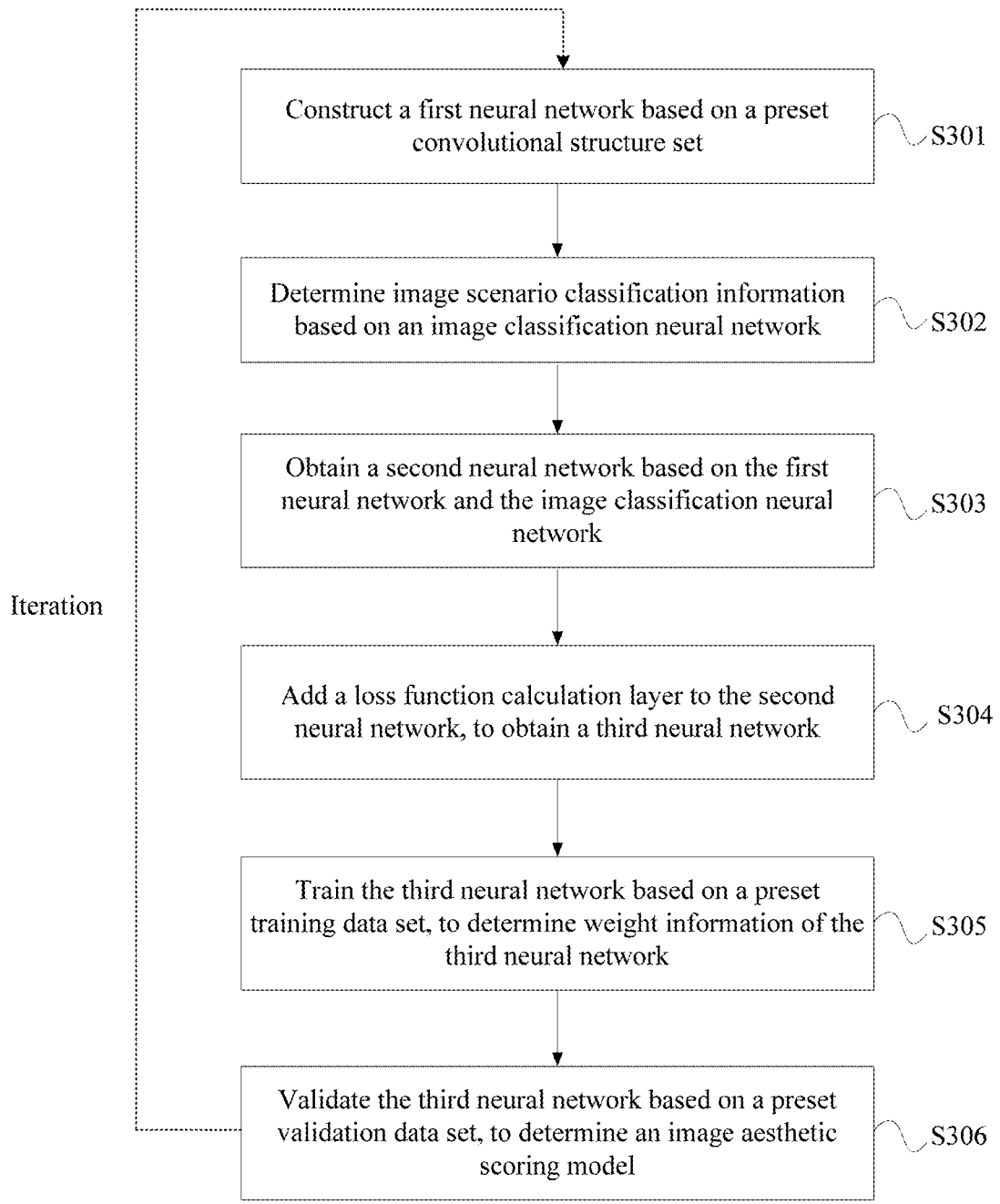
FIG. 3 is a schematic flowchart of a method for generating an image aesthetic scoring model according to this application.

FIG. 3 is a schematic flowchart of a method for generating an image aesthetic scoring model according to this application. The method is performed by the foregoing electronic device, and a specific deployment architecture for the method is the system architecture shown in FIG. 2. As shown in FIG. 3, the method specifically includes the following steps.

S301. Construct a first neural network based on a preset convolutional structure set.

The preset convolutional structure set is specifically a set including a plurality of convolutional structures or a set of a plurality of neural networks. The first neural network is specifically a backbone neural network.

Optionally, the preset convolution type library may be constructed in advance by using either of the following two construction methods:

(1) Construction Method Based on a Convolutional Structure

In this construction method, a specific convolutional structure may be selected. For example, convolutional structures available for selection include a convolutional structure with a fixed geometric structure (for example, a 3*3 rectangular convolution kernel), a deformable convolutional structure, an expanded convolutional structure, a residual convolutional structure, and the like.

This method is mainly used to construct a convolutional atomic structure. To be specific, a convolution type library constructed by using the method includes a plurality of convolutional structures. The convolution type library can be used to construct a fine-grained backbone neural network, so that the neural network constructed based on this convolution type library has a better structure.

(2) Construction Method Based on a Neural Network

In this construction method, a plurality of classic neural network structures can be selected, such as AlexNet and VGG.

This method is mainly used to construct a classic overall network structure. To be specific, a convolution type library constructed by using the method includes a plurality of classic neural networks. The neural network based on the convolution type library has short training time and high efficiency.

It should be noted that a quantity of convolutional structures in the convolutional structure set constructed by using either of the foregoing construction methods is not limited, and can be expanded flexibly.

In a specific implementation process, the method for constructing the preset convolutional structure set may be flexibly selected based on an actual need. This is not limited in this application.

Further, the backbone neural network may be constructed based on the preset convolutional structure set.

Optionally, a backbone neural network feasible for extracting a required feature can be constructed by using the convolutional structure or the neural network in the preset convolution set as a candidate network structure unit, and features required by an image aesthetic scoring model as constraints (the required features include a rule, a parameter, and the like).

S302. Obtain an image classification neural network.

The image classification neural network is used to classify image scenarios, and can output image scenario classification information.

S303. Obtain a second neural network based on the first neural network and the image classification neural network.

The second neural network is a neural network containing scenario information.

A hidden layer of the backbone neural network obtained in step S301 is non-interpretable. If the image aesthetic scoring model is generated directly based on the backbone neural network, the image aesthetic scoring model cannot provide a scoring criterion when used to score an image. Therefore, in this step, the neural network including the scenario information is generated based on the backbone neural network and the image classification neural network, so that the finally generated image aesthetic scoring model has interpretability.

Specifically, the image classification neural network may be a neural network generated in advance. The image classification neural network identifies and classifies hidden scenario information and color information contained in an image. The hidden scenario information that can be identified may include, for example, a portrait scenario, a landscape scenario, and a sports scenario that may be specifically determined through face recognition, expression recognition, night and day recognition, indoor and outdoor recognition, static object and dynamic object recognition, and whether a rule of thirds is used, so that an image score of an image may be interpreted from aspects such as scenario matching, color balance, lighting suitability, and content prominence.

Optionally, the second neural network may be obtained based on the backbone neural network and the image classification neural network by using either of the following methods.

(1) Concatenation Method

Specifically, the first neural network is concatenated with the image classification neural network, to obtain the second neural network.

The image classification neural network is also a kind of convolutional neural network, and is constructed from an atomic structure of the convolutional neural network. Therefore, the first neural network and the image classification neural network may be directly concatenated through a concatenation layer to obtain the second neural network including the scenario information.

(2) Parameter Sharing Method

Specifically, parameter sharing is performed between the first neural network and the image classification neural network, to obtain the second neural network.

In this method, parameter sharing is performed between the backbone neural network and the image classification neural network, so that a hidden layer of the obtained second neural network can better extract score-related hidden information.

In this step, the image classification neural network is added, so that the finally obtained image aesthetic scoring model can interpret scenario information, such as scenario matching, color balance, lighting suitability, and content prominence, making an image scoring result interpretable and greatly improving user experience.

S304. Add a loss function calculation layer to the second neural network, to obtain a third neural network.

At the loss function calculation layer, several independent one-to-many classifiers are integrated in one image scoring process by setting an order-based loss function.

In an optional implementation, the loss function calculation layer includes a plurality of classifiers, each classifier corresponds to a score, and the classifier is used to determine a relationship between an image score and the score corresponding to the classifier, so that a final score of an image comprehensively reflects prediction results of the plurality of classifiers.

For example, loss functions at the loss function calculation layer may be specifically a cross-entropy loss function and a class center loss function.

In this step, several independent one-to-many classifiers are integrated in one image scoring process by setting an order-based loss function, thereby improving system robustness.

S305. Train the third neural network based on a preset training data set, to determine weight information of the third neural network.

Optionally, training may be performed in a single image training mode, or a batch image training mode, or a combination thereof. Details are as follows:

(1) Single Image Training Mode

A training data set (namely, a first training data set) corresponding to the single image training mode includes a plurality of images, and each image includes score information. In other words, the training data set includes not only image pixel information but also score annotation information.

When the single image training mode is used for model training, the images in the first training data set are input into the third neural network one by one, to train the third neural network.

(2) Batch Image Training Mode

A training data set (namely, a second training data set) corresponding to the batch image training mode includes a plurality of images, and each image includes score ranking information of the image in the second training data set. In other words, the second training data set includes only the score ranking information, but not image score annotation information.

Optionally, when the batch image training mode is used for model training, the images may be divided into a plurality of image pairs for training, or the images may be divided into a plurality of subsets for training.

Specifically, when the images are divided into a plurality of image pairs for training, the images in the training set are grouped in pairs. First, the third neural network is replicated, and then two images in each image pair are input into the third neural network and a neural network replicated from the third neural network, respectively, to obtain scores of the two images. Further, loss calculation is performed based on a difference between the scores of the two images and score ranking information of the two images, to determine the weight information of the third neural network.

In another manner, when the images are divided into a plurality of subsets, each subset includes a plurality of images. First, the images in each subset are input into the third neural network, in other words, the images in the subset are input into the third neural network in batches, to obtain score information of each image. Further, based on the score information of each image, the weight information of the third neural network is determined by using a loss function based on statistical probability distribution through gradient descent backpropagation.

It should be noted that in a specific implementation process, either of the two image training modes or a combination thereof may be selected based on an actual need. When a combination of the two methods is used, specific score values may be learned or fitted in the single image training mode, and then image score raking may be learned in the batch image training mode, to determine a difference between high-score and low-score pictures.

In this step, the third neural network is trained in the single image training mode and/or batch image training mode. This can improve accuracy of the model. In addition, only score ranking information rather than image score information needs to be labeled for training images used in the batch image training mode. Complexity of labeling the score ranking information is lower. Therefore, the batch image training mode can significantly lower a requirement on training data for model training, thereby effectively expanding a training data set.

S306. Validate the third neural network based on a preset validation data set, to determine the image aesthetic scoring model.

Specifically, the weight information of the third neural network may be obtained through training in step S305, that is, a third neural network with real weight information is obtained. In this step, the third neural network with the real weight information is validated based on the preset validation data set, to obtain a validation indicator value. The indicator value may be used to measure quality of the third network.

Optionally, validation indicators may include an accuracy rate, a recall rate, a prediction result, and statistical correlation with standard information.

It should be noted that the preset validation data set and the preset training data set may be derived from a same data set. In a specific implementation process, the training data set and the validation data set may be selected from the same data set based on a specific method. For example, methods such as cross-validation and fixed-ratio partitioning may be used to select the training data set and the validation data set.

The complete third neural network is obtained in step S301 to step S306, and the indicator value of the third neural network is obtained through validation. Further, the indicator value of the third neural network is applied to the process of constructing the first neural network in step S301. Specifically, the convolutional structures of the first neural network are adjusted based on a current indicator value by using a preset traversal algorithm, for example, replacing some convolution layers to construct a new first neural network, and then step S302 to step S306 are performed to obtain a new indicator value. Iteration proceeds continuously in this way until an obtained indicator value approaches a preset optimal value, and a third neural network used in this case is the finally obtained image aesthetic scoring model.

A convolutional structure is adjusted by using the foregoing preset convolution type library and the traversal algorithm. This can effectively increase scoring accuracy of a model, and flexibly evaluate an actual effect of different combinations of convolution kernels and convolutions on aesthetic scoring.

It should be noted that based on an actual need, when step S301 is performed, different convolutional structures may be selected at the same time to construct a plurality of backbone neural networks, and subsequent steps are performed separately for each backbone neural network, so that a plurality of candidate neural networks and indicator values thereof can be obtained simultaneously, thereby improving model generation efficiency.

In this embodiment, scenario information is integrated into the backbone neural network, so that a resulting image aesthetic scoring model is interpretable. In addition, scoring accuracy of the image aesthetic scoring model can be improved by using the preset convolutional structure set.

The following describes a specific implementation process of the image score downgrade processing method according to this application.

Figure 4:
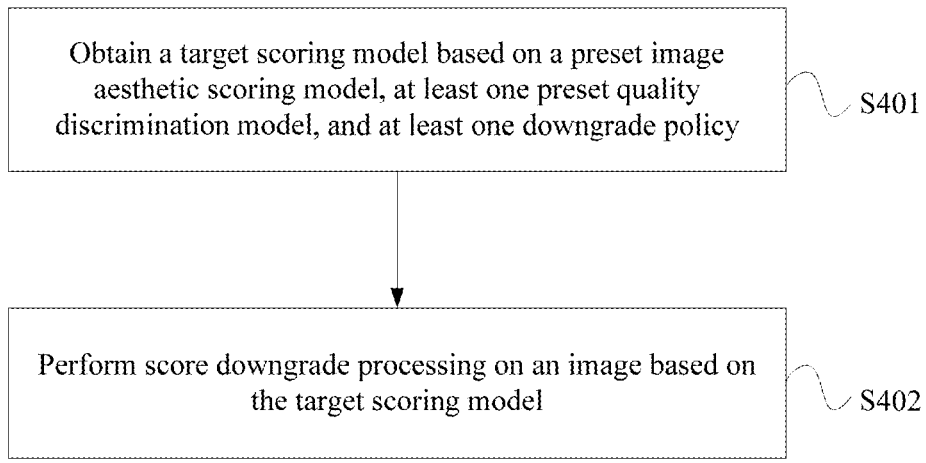
FIG. 4 is a schematic flowchart of an image score downgrade processing method according to this application.

FIG. 4 is a schematic flowchart of an image score downgrade processing method according to this application. The method is executed by the foregoing electronic device. As shown in FIG. 4, the method includes the following steps.

S401. Obtain a target scoring model based on a preset image aesthetic scoring model, at least one preset quality discrimination model, and at least one downgrade policy.

The preset image aesthetic scoring model may be the image aesthetic scoring model generated in the foregoing embodiment, or may be another pre-generated image aesthetic scoring model. An input of the image aesthetic scoring model is an image, an output of the image aesthetic scoring model is a score of the image, and the score of the image is interpretable.

The preset quality discrimination model is used to identify and process factors causing low image quality. The factors causing low image quality may include, for example, overexposure, shake, object out of focus, image interference, background clutter, and figure or landscape skew.

Optionally, at least one single-factor quality discrimination model may be used in this application. In other words, each quality discrimination model is used to identify and process one low-quality factor. These single-factor quality discrimination models may be existing models, or may be constructed by using any classification algorithm and model. This is not limited in this application. An electronic device may pre-select, through user settings or the like, a low-quality factor that matches a specific application scenario. Then, the electronic device selects, based on the selected low-quality factor, a quality discrimination model corresponding to the low-quality factor.

For example, if a user selects three low-quality factors: image skew, eye closing, and overexposure through settings, the electronic device selects three quality discrimination models corresponding to these three low-quality factors. Further, the e-book device integrates these three quality discrimination models with the image aesthetic scoring model obtained in advance, uses outputs of the image aesthetic scoring model as inputs of the three quality discrimination models, and performs downgrade processing on an integrated model by using a preset downgrade policy, to obtain a target scoring model. The target scoring model is a best prediction model related to a specific aesthetic scoring application scenario.

Optionally, for example, the preset downgrade policy may be the following.

(1) First Downgrade Policy

The downgrade policy is an absolute downgrade policy. In this downgrade policy, a separate score level is established for a low-quality factor. Once a quality discrimination model identifies that there is a specific factor in an image, an aesthetic score of the image is fixed at a lower score grade. To be specific, there is a first preset correspondence between a low-quality factor affecting an image score and the image score.

For example, if image shake occurs, the image score is not higher than 2 points; and if overexposure occurs, the image score is not higher than 3 points. Furthermore, a lowest score among the foregoing two scores and a score output by the image aesthetic scoring model is used as a score output by the target scoring model.

(2) Second Downgrade Policy

This downgrade policy is a relative downgrade policy. In this downgrade policy, a score decrease proportion is set for each low-quality factor. In scoring, the image aesthetic scoring model is used to predict an image score, and then, the quality discrimination model identifies a low-quality factor. If there are low-quality factors in an image, the score output by the image aesthetic scoring model is decreased based on a score decrease proportion of each factor. To be specific, there is a second preset correspondence between a low-quality factor affecting an image score and an image score decrease proportion.

(3) Third Downgrade Policy

The downgrade policy is a regression learning downgrade function policy. In this downgrade policy, a low-quality image is used as training data, and supervised learning such as logistic regression is used to automatically learn a downgrade function between an image aesthetic scoring model and a quality discrimination model.

S402. Perform score downgrade processing on an image based on the target scoring model.

The target scoring model obtained in step S401 not only has the function of the foregoing image aesthetic scoring model, but also integrates image score downgrade processing. The downgrade processing makes an aesthetic scoring result much more sensitive to a low-quality factor of concern in a specific application scenario.

In this embodiment, image score downgrade processing is integrated into the image aesthetic scoring model. The downgrade processing makes an aesthetic scoring result much more sensitive to a low-quality factor of concern in a specific application scenario.

The following describes a specific implementation process of the image re-ordering method according to this application.

Figure 5:
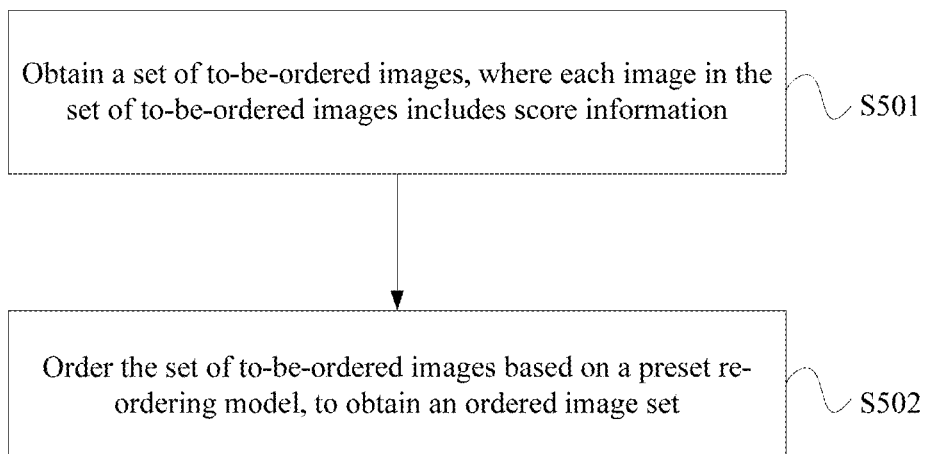
FIG. 5 is a schematic flowchart of an image re-ordering method according to this application.

FIG. 5 is a schematic flowchart of an image re-ordering method according to this application. The method is executed by the foregoing electronic device, and specifically, the re-orderer shown in FIG. 2. As shown in FIG. 5, the method includes the following steps.

S501. Obtain a to-be-ordered image set, where each image in the to-be-ordered image set includes score information.

Optionally, the score information of each image in the to-be-ordered image set may be obtained by the foregoing image aesthetic scoring model or the foregoing target scoring model. Which model is to be used is determined by a specific application scenario.

For example, when an application scenario does not need to be sensitive to any low-quality factor, the foregoing image aesthetic scoring model is used. Specifically, the images (only images, but no score information) in the original to-be-ordered image set are input into the image aesthetic scoring model, to obtain the score information of each image in the to-be-ordered image set. In this way, the to-be-ordered image set can be obtained.

S502. Order the to-be-ordered image set based on a preset re-ordering model, to obtain an ordered image set.

Specifically, each image in the to-be-ordered image set obtained in step S501 has the score information. In other words, the images in the to-be-ordered image set may be ordered once based on the score information. In this step, the to-be-ordered image set is ordered once again based on the preset re-ordering model, that is, re-ordering is performed. A re-ordering result can reflect feature information of a user, that is, personalized information such as habits and preferences of the user.

The re-ordering model is constructed based on a reinforcement learning framework, the re-ordering model is used to feed back feature information of the user, and the reinforcement learning framework includes a state and a reward. The feature information of the user is used to represent preferences of the user.

Optionally, in this application, the re-ordering model is constructed based on a Markov decision process (MDP). The MDP is a typical reinforcement learning modeling method. Based on an MDP framework, an action, a policy, a state, a state transition, and a reward need to be defined. The state and the reward describe a random environment, and the policy is a state-to-action mapping.

In this application, the foregoing re-ordering model is first constructed and trained based on the MDP. After training is completed, step S502 is performed, that is, the to-be-ordered set is ordered based on the re-ordering model to obtain the ordered image set.

The following first describes a model construction process.

Figure 6:
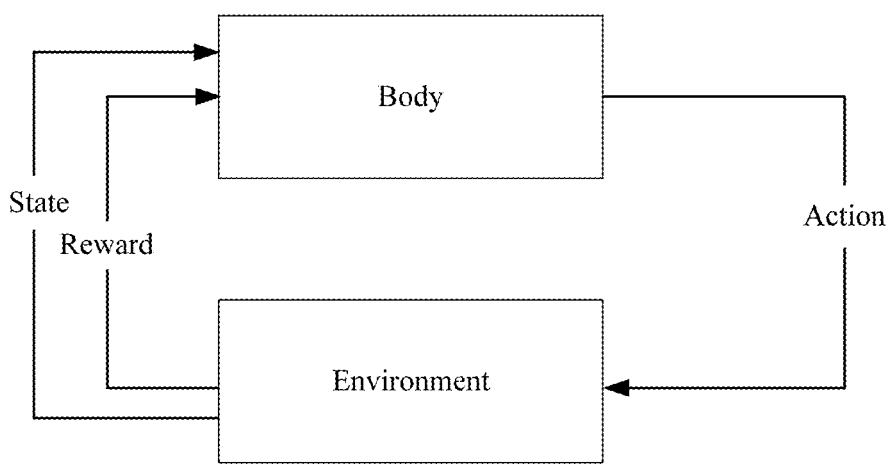
FIG. 6 is a schematic diagram of an MDP-based reinforcement learning framework.

FIG. 6 is a schematic diagram of an MDP-based reinforcement learning framework. As shown in FIG. 6, the reinforcement learning framework includes the following parts.

(1) Body

The body is an execution body of picture re-ordering. The body uses an environment state as an input, and selects an action for execution from an action set based on a learned policy.

(2) State

A current position is denoted as t, and a characteristic set of remaining to-be-selected photos is denoted as Xt. An "eigenvector x" is concatenation of a picture convolutional neural network eigenvector (from a higher layer of a neural network model) and a user portrait eigenvector.

(3) Action

The action is selecting a picture in the set Xt for the current position t.

(4) Transfer

Transfer from the current position t to a next position t+1 of the current position, where t+1 is not equal to t.

(5) Reward

The reward may include the following types:

a reward based on user clicks;

a reward based on user's stay time at an image, which may be obtained by calculating a similarity with a picture set with a long stay time, or directly calculating historical cumulative time of visiting the image by the user;

a reward based on a matching degree with a user portrait, which may be obtained by calculating a matching degree between an image and the user portrait;

a reward based on a personalized "favorite" album, which may be obtained by collecting, in real time based on a system log, a picture set with most user clicks;

a reward based on a personalized "disliked/prohibited" album, which may be obtained by, for example, collecting an indecent picture set or excluding an indecent picture;

a reward based on priori, which may be obtained by obtaining a score of a picture from, for example, the foregoing target scoring model; and an overall reward: a combination of foregoing reward values through a reward function, where, for example, a weight-based linear function may be used as the reward function.

The following describes a model training process.

Optionally, after the re-ordering model is constructed, the re-ordering model may be trained based on user information and the score information.

The user information may be obtained based on a user operation. The user operation includes operation content, an operation order, and operation time.

Optionally, the user operation may be obtained based on user feedback, or may be obtained through a user click log. The user click log mainly records user clicks, order information of user clicks, and stay time on each returned result.

During the re-ordering model training, a neural network (or another classification model) is defined to learn a state-to-action mapping, that is, make a decision as the body in the foregoing reinforcement learning framework. The neural network may be of any network structure, such as a convolutional neural network. An input of this policy network is a state vector, and in a case of different ordering problems, outputs of the policy network may be probabilities of selecting different images (behaviors) by nodes of different forms. Further, for an output of each aesthetic scoring model or target scoring model, a Monte Carlo simulation method is used to calculate an expected return of each optional behavior set, and a behavior policy for an optimal expected return is selected. Loss calculation is performed on an output of the neural network, and finally back-propagation is performed to directly optimize a parameter of the policy network.

For an initial policy network, score ranking of original neural networks is used as a selection criterion. A higher score indicates a higher probability of being selected.

In this application, a length of an output of the image aesthetic scoring model or the target scoring model may be classified by a fixed-length re-ordering set or a variable-length re-ordering set. In the fixed-length re-ordering set, that is, a quantity of to-be-ordered pictures for the image aesthetic scoring model or the target scoring model is fixed each time, an output of the policy network may be a fixed-length softmax probability. In the variable-length re-ordering set, that is, a quantity of to-be-ordered pictures for the image aesthetic scoring model is not fixed each time, an output may be set as a single node as softmax cannot be used to model behavior policy selection.

In this embodiment, for example, if a convolutional neural network is used, input nodes of the network are a feature set of the to-be-ordered images and user profile data. In this case, a policy for the fixed-length re-ordering set may be used (a quantity of image sets may be fixed as a specified parameter).

Further, performing re-ordering by using the re-ordering model is specifically a process of using a policy network for prediction. Specifically, based on a policy network, a picture is selected at a decision point of each stage, to implement ranking.

In this embodiment, scoring results of an existing image aesthetic scoring model are re-ordered, so that an ordering result better reflects personalized information of a user. Re-ordering is based on a reinforcement learning framework. As a result, user feedback information can be considered more flexibly to perform adaptive learning to adjust the ordering result.

The method for generating an image aesthetic scoring model, the image score downgrade processing method, and the image re-ordering method provided in this application are further described with reference to specific examples.

It should be noted that in the following examples, the method for generating an image aesthetic scoring model and the image score downgrade processing method are described in one example. To be specific, an image aesthetic scoring model generated in the method for generating an image aesthetic scoring model is used as an image aesthetic scoring model used in the image score downgrade processing method. In addition, for steps with a plurality of optional implementations, one of the optional implementations is selected for description in the following examples.

Figure 7:
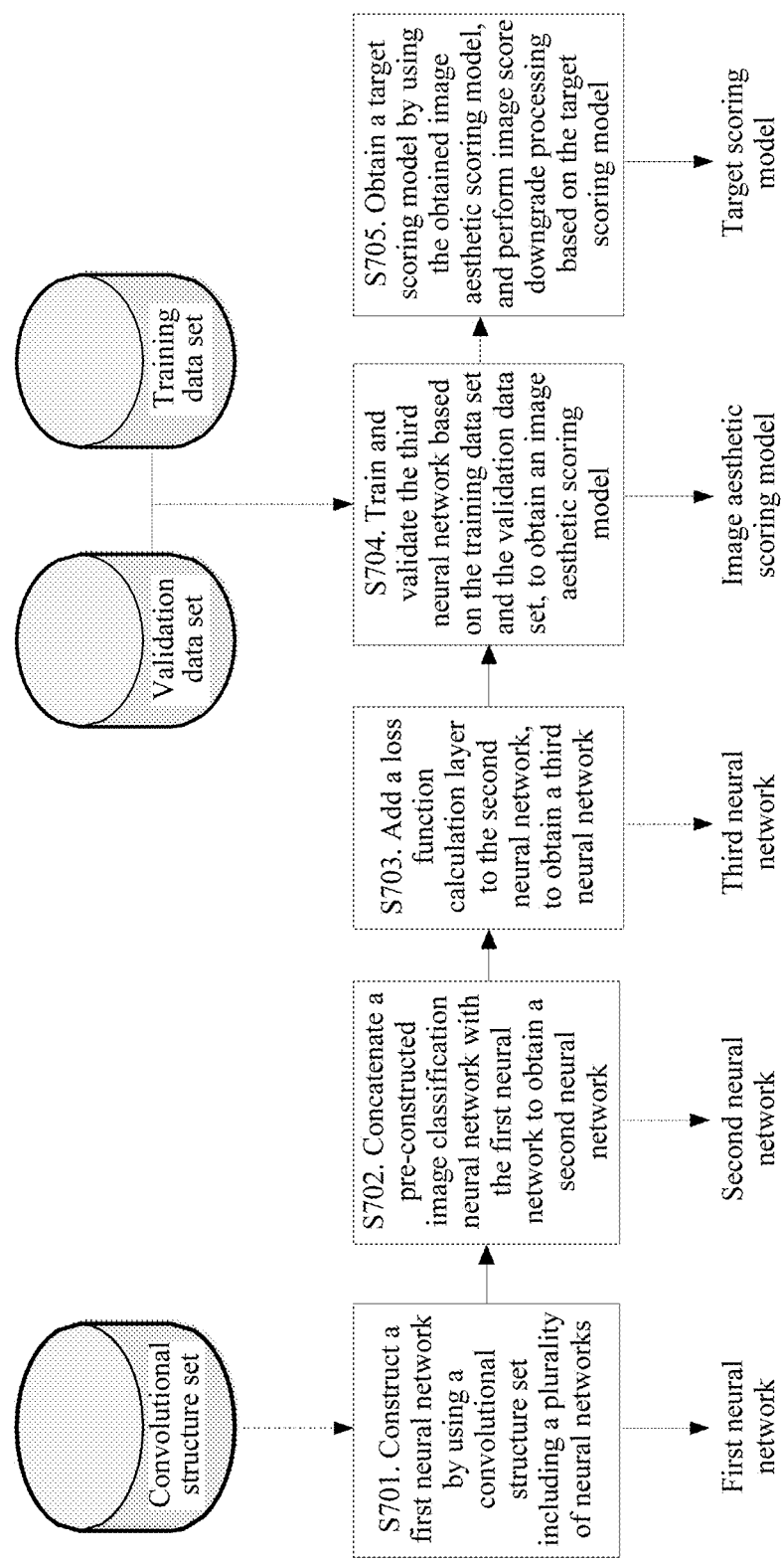
FIG. 7 is a schematic flowchart of an example of image aesthetic scoring model generation and score downgrade.

FIG. 7 is a schematic flowchart of an example of image aesthetic scoring model generation and score downgrade. As shown in FIG. 7, a specific processing process is as follows.

S701. Construct a first neural network by using a convolutional structure set including a plurality of neural networks.

Figure 8:
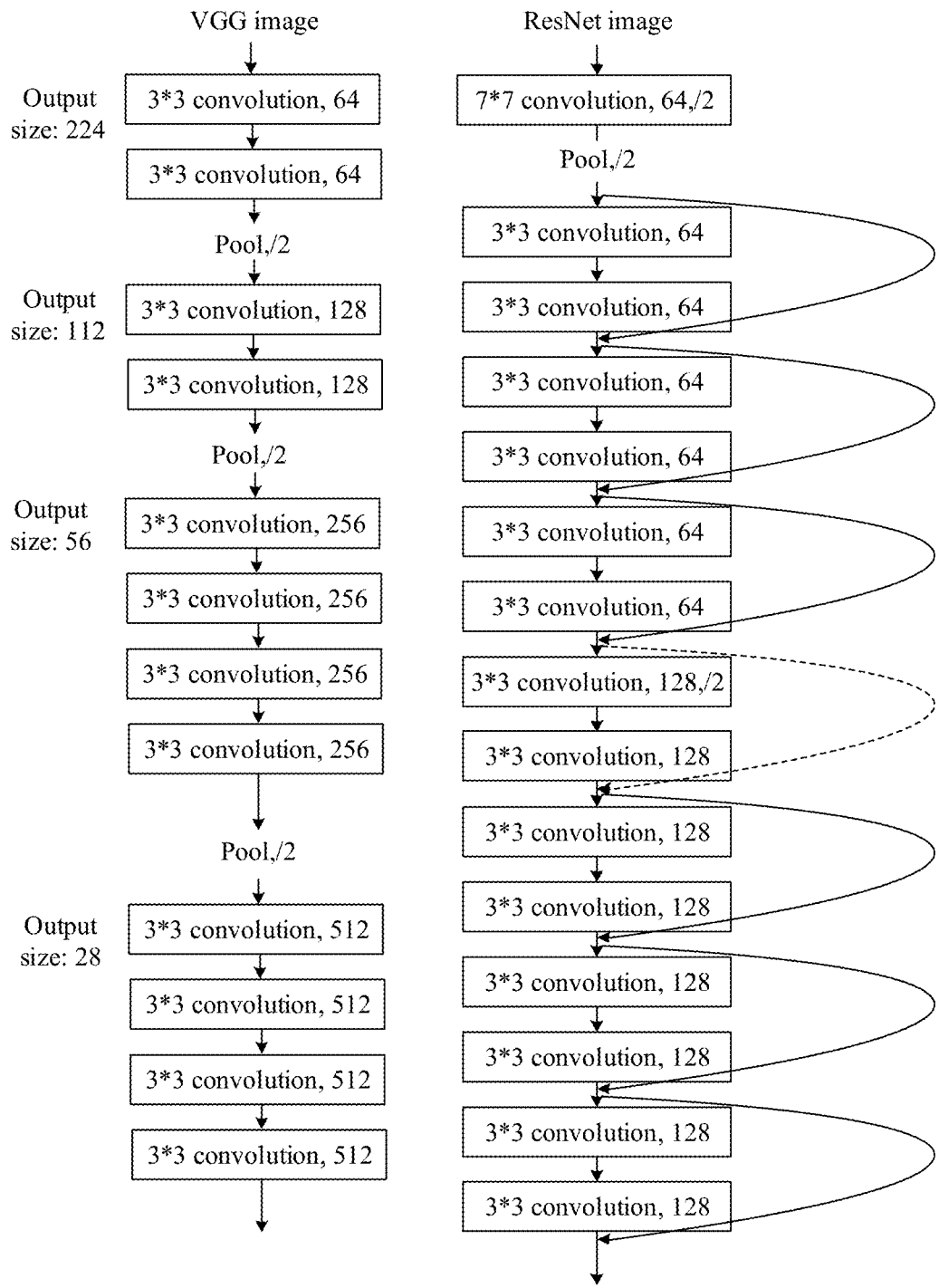
FIG. 8 is an example diagram of a classic neural network structure.

In this example, the convolutional structure set includes a plurality of classic neural network structures, which are specifically AlexNet, ResNet, VGG, Google Inception Net v1 and v3, and MobileNet. FIG. 8 is an example diagram of a classic neural network structure.

Further, an electronic device selects at least one neural network structure from the plurality of classic neural network structures as the first neural network, and performs subsequent steps S702 to S704 concurrently, to obtain a validation result.

S702. Concatenate a pre-constructed image classification neural network with the first neural network to obtain a second neural network.

Figure 9:
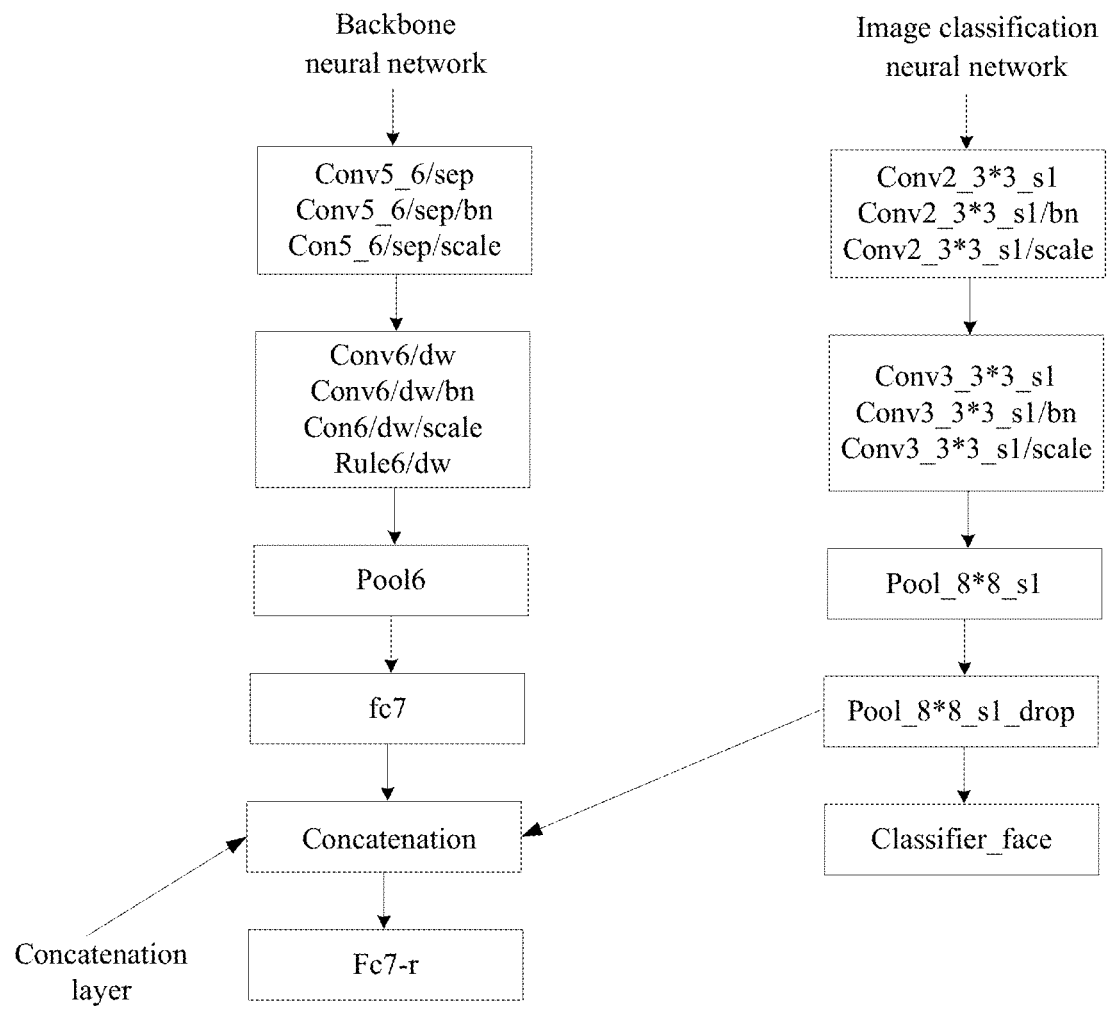
FIG. 9 is a schematic diagram of concatenating an image classification neural network with a first neural network through a concatenation layer.

FIG. 9 is a schematic diagram of concatenating an image classification neural network with a first neural network through a concatenation layer. As shown in FIG. 9, the image classification neural network includes five hidden layers of a 3*3 convolutional structure and the concatenation layer. After the image classification neural network is concatenated with the first neural network through the concatenation layer, the obtained second neural network contains scenario information.

S703. Add a loss function calculation layer to the second neural network, to obtain a third neural network.

In this example, the loss function calculation layer includes 20 nodes, of which every two nodes form a group. The 20 nodes may be regarded as 10 independent classifiers (C1, . . . , C10), and each classifier performs the following discrimination on an image score in a ranking order of the classifier: a classifier Ci is responsible for determining whether the score of the to-be-scored image is i (a first node outputs 1, and a second node outputs 0), or greater than i (the first node outputs 0, and the second node outputs 1); and C10 is responsible for determining whether the score of the to-be-scored image is 10. A score predicted by an output layer may be calculated according to the following formula:

$$q = 1 + \Sigma_{k=1}^{K-1} f k(x'),$$

where the fk function is a scoring result produced by a $k^{th}$ classifier for a to-be-scored image x', and if a first node of the classifier outputs 1, fk (x') is 0; otherwise, fk (x') is 1.

The selected loss function is:

$$L = Ls + \lambda lc = -\sum_{i=1}^{m} \log \frac{e^{w_{yi}^T x_i + b_{yi}}}{\sum_{j=1}^{n} e^{w_j^T x_i + b_j}} + \frac{\lambda}{2} \sum_{i=1}^{m} \|xi - C_{yi}\|_2^2,$$

where Ls is a cross-entropy loss function of each classifier, and Lc is a class center loss function (Center loss function), and measures a difference between the to-be-scored image x' and an average value of samples that are of a same standard class as the image x'. A hyperparameter λ is used to balance Ls (which ensures that a different-class distance is as far as possible) and Lc (which ensures that eigenvectors of a same class are as close as possible).

S704. Train and validate the third neural network based on a training data set and a validation data set, to obtain an image aesthetic scoring model.

In this example, the third neural network is trained by using a combination of a single image training mode and a batch image training mode. First, images labeled with scores in the training data set are input into the third neural network one by one for training, and then images labeled with only score ranking information in the training data set are input into the third neural network in batches for training, to obtain weight information.

In addition, in step 701, the plurality of classic neural networks are separately selected for model construction, training, and validation. In this step, based on results of the classic neural networks, a third neural network corresponding to an optimal validation indicator value is selected as the image aesthetic scoring model.

S705. Obtain a target scoring model by using the image aesthetic scoring model obtained in step S704, and perform image score downgrade processing based on the target scoring model.

In this example, a downgrade policy of a downgrade function is learned through regression, and the downgrade function is learned by performing softmax regression on classifiers for image skew, eye closing, and overexposure, and a prediction result of the image aesthetic scoring model, to obtain the target scoring model.

It should be noted that actual testing and validation prove that an image score accuracy rate of the method provided in this application is significantly improved compared with the prior art. In actual testing and validation, two indicators: a Top-1 accuracy rate and a Spearman correlation, are used for measurement. Results show the method provided in this application achieves a Top-1 accuracy rate of 95% and the Spearman correlation of 0.64. Both indicators are significantly improved over the prior art.

Specific applications of the methods provided in this application are described below.

For example, the methods described in the foregoing embodiments of this application may be applied to the following image processing scenarios:

Scenario 1

Aesthetic scoring, downgrade processing, and re-ordering are performed periodically by using the methods provided in this application on each of images shot by a user in a period of time. One or more of the three methods may be selected based on an actual need. For example, aesthetic scoring, downgrade processing, and re-ordering are all performed on the images, and a re-ordering result is used as a final ranking result of the images.

Further, a preset quantity of pictures or pictures with scores exceeding a preset score within this period of time are selected based on the final ranking result of the images, to generate a "best shots" album. That is, an optimal image most satisfying user feelings can be automatically and accurately determined by using the method provided in this application, thereby greatly improving user experience.

Scenario 2

A user continuously shoots a plurality of images at a same location in a relatively short period of time. Aesthetic scoring, downgrade processing, and re-ordering are performed on each image by using the methods provided in this application, to determine and label a preset quantity of optimal images based on obtained scores and rankings. For example, a star mark is added to these optimal images for quick view and selection by the user. This greatly improves user experience.

Scenario 3

A user continuously shoots a plurality of images at a same location in a relatively short period of time. Aesthetic scoring, downgrade processing, and re-ordering are performed on each image by using the methods provided in this application, to determine and store a preset quantity of optimal images based on obtained scores and rankings, and delete other images with the confirmation of the user. This helps the user quickly delete an image with relatively poor shooting effects, and greatly improves user experience.

Figure 10:
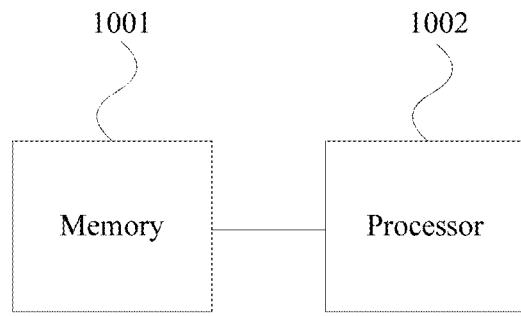
FIG. 10 is a physical block diagram of an electronic device according to this application.

FIG. 10 is a physical block diagram of an electronic device according to this application. As shown in FIG. 10, the electronic device includes a memory 1001 and a processor 1002.

The memory 1001 is configured to store a program instruction.

The processor 1002 is configured to invoke the program instruction in the memory 1001 to perform the following method:

constructing a first neural network based on a preset convolutional structure set;

obtaining an image classification neural network, where the image classification neural network is used to classify image scenarios;

obtaining a second neural network based on the first neural network and the image classification neural network, where the second neural network is a neural network containing scenario information; and determining an image aesthetic scoring model based on the second neural network, where output information of the image aesthetic scoring model includes image scenario classification information.

Further, the image aesthetic scoring model is applied to the electronic device, the electronic device includes a dual execution environment, and the image aesthetic scoring model runs in a trusted execution environment of the dual execution environment.

Further, the processor 1002 is specifically configured to:

concatenate the first neural network with the image classification neural network, to obtain the second neural network.

Further, the processor 1002 is specifically configured to:

perform parameter sharing between the first neural network and the image classification neural network, to obtain the second neural network.

Further, the processor 1002 is specifically configured to:

add a loss function calculation layer to the second neural network, to obtain a third neural network;

train the third neural network based on a preset training data set, to determine weight information of the third neural network; and validate the third neural network based on a preset validation data set, to determine the image aesthetic scoring model.

Further, the loss function calculation layer includes a plurality of classifiers, each classifier corresponds to a score, and the classifier is used to determine a relationship between an image score and the score corresponding to the classifier.

Further, loss functions at the loss calculation layer are a cross-entropy loss function and a class center loss function.

Further, the processor 1002 is specifically configured to:

train the third neural network based on a first training data set, to determine the weight information of the third neural network, where the first training data set includes a plurality of images, and each image includes score information; and/or train the third neural network based on a second training data set, to determine the weight information of the third neural network, where the second training data set includes a plurality of images, and each image includes score ranking information of the image in the second training data set.

Further, the processor 1002 is specifically configured to:

input the images in the first training data set into the third neural network one by one, to train the third neural network.

Further, the processor 1002 is specifically configured to:

divide the images in the second training data set into a plurality of image pairs, and input two images in each image pair into the third neural network and a neural network replicated from the third neural network, respectively; and perform loss calculation based on scores and score ranking information of the two images, to determine the weight information of the third neural network.

Further, the processor 1002 is specifically configured to:

divide the images in the second training data set into a plurality of subsets, and input an image in each subset into the third neural network, to obtain score information; and determine, based on the score information, the weight information of the third neural network by using a loss function based on statistical probability distribution through gradient descent backpropagation.

Further, the processor 1002 is configured to:

construct, by using a preset traversal algorithm, a new first neural network based on an indicator value obtained after validation.

Figure 11:
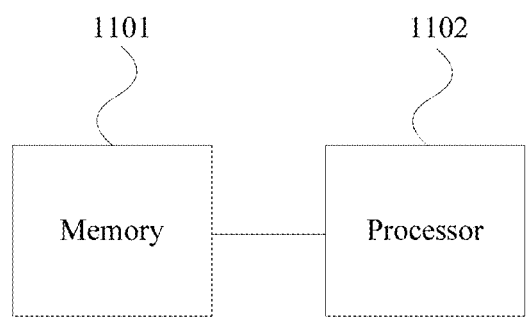
FIG. 11 is a physical block diagram of another electronic device according to this application.

FIG. 11 is a physical block diagram of another electronic device according to this application. As shown in FIG. 11, the electronic device includes a memory 1101 and a processor 1102.

The memory 1101 is configured to store a program instruction.

The processor 1102 is configured to invoke the program instruction in the memory 1101 to perform the following method:

obtaining a target scoring model based on a preset image aesthetic scoring model, at least one preset quality discrimination model, and a preset downgrade policy; and performing score downgrade processing on an image based on the target scoring model.

Further, the processor 1102 is specifically configured to:

integrate the image aesthetic scoring model with the at least one quality discrimination model, and perform downgrade processing on an output of an integrated model by using the preset downgrade policy, to obtain the target scoring model.

Further, the downgrade policy includes at least one of the following:

a first downgrade policy, where in the first downgrade policy, there is a first preset correspondence between a low-quality factor affecting an image score and the image score;

a second downgrade policy, where in the second downgrade policy, there is a second preset correspondence between a low-quality factor affecting an image score and an image score decrease proportion; and a third downgrade policy, where in the third downgrade policy, a low-quality image is used as training data to obtain a downgrade function between the image aesthetic scoring model and the quality discrimination model.

Further, the target scoring model is applied to the electronic device, the electronic device includes a dual execution environment, and the image aesthetic scoring model runs in a trusted execution environment of the dual execution environment.

Figure 12:
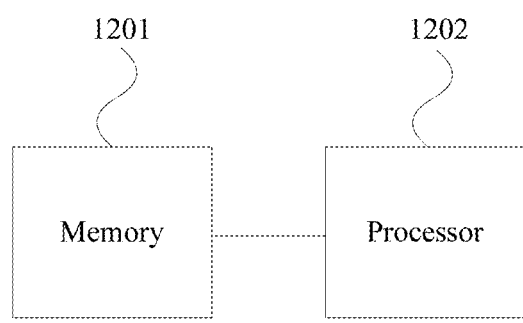
FIG. 12 is a physical block diagram of still another electronic device according to this application.

FIG. 12 is a physical block diagram of still another electronic device according to this application. As shown in FIG. 12, the electronic device includes a memory 1201 and a processor 1202.

The memory 1201 is configured to store a program instruction.

The processor 1202 is configured to invoke the program instruction in the memory 1201 to perform the following method:

obtaining a to-be-ordered image set, where each image in the to-be-ordered image set includes score information; and ordering the to-be-ordered image set based on a preset re-ordering model, to obtain an ordered image set, where the re-ordering model is constructed based on a reinforcement learning framework, the re-ordering model is used to feed back feature information of a user, and the reinforcement learning framework includes a state and a reward.

Further, the processor 1202 is specifically configured to:

train the re-ordering model based on user information and the score information, where the user information is obtained based on a user operation, and the user operation includes operation content, an operation sequence, and operation time.

Figure 13:
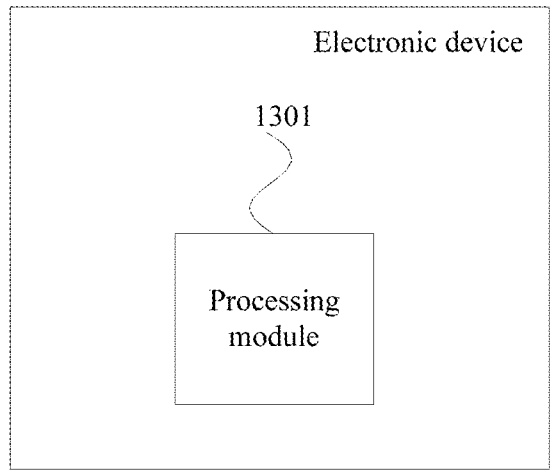
FIG. 13 is a module structure diagram of an electronic device according to this application.

FIG. 13 is a module structure diagram of an electronic device according to this application. As shown in FIG. 13, the electronic device includes a processing module 1301, configured to:

construct a first neural network based on a preset convolutional structure set;

obtain an image classification neural network, where the image classification neural network is used to classify image scenarios;

obtain a second neural network based on the first neural network and the image classification neural network, where the second neural network is a neural network containing scenario information; and determine an image aesthetic scoring model based on the second neural network, where output information of the image aesthetic scoring model includes image scenario classification information.

Further, the image aesthetic scoring model is applied to the electronic device, the electronic device includes a dual execution environment, and the image aesthetic scoring model runs in a trusted execution environment of the dual execution environment.

Further, the processing module 1301 is specifically configured to:

concatenate the first neural network with the image classification neural network, to obtain the second neural network.

Further, the processing module 1301 is specifically configured to:

perform parameter sharing between the first neural network and the image classification neural network, to obtain the second neural network.

Further, the processing module 1301 is specifically configured to:

add a loss function calculation layer to the second neural network, to obtain a third neural network;

train the third neural network based on a preset training data set, to determine weight information of the third neural network; and validate the third neural network based on a preset validation data set, to determine the image aesthetic scoring model.

Further, the loss function calculation layer includes a plurality of classifiers, each classifier corresponds to a score, and the classifier is used to determine a relationship between an image score and the score corresponding to the classifier.

Further, loss functions at the loss calculation layer are a cross-entropy loss function and a class center loss function.

Further, the processing module 1301 is specifically configured to:

train the third neural network based on a first training data set, to determine the weight information of the third neural network, where the first training data set includes a plurality of images, and each image includes score information; and/or train the third neural network based on a second training data set, to determine the weight information of the third neural network, where the second training data set includes a plurality of images, and each image includes score ranking information of the image in the second training data set.

Further, the processing module 1301 is specifically configured to:

input the images in the first training data set into the third neural network one by one, to train the third neural network.

Further, the processing module 1301 is specifically configured to:

divide the images in the second training data set into a plurality of image pairs, and input two images in each image pair into the third neural network and a neural network replicated from the third neural network, respectively; and perform loss calculation based on scores and score ranking information of the two images, to determine the weight information of the third neural network.

Further, the processing module 1301 is specifically configured to:

divide the images in the second training data set into a plurality of subsets, and input an image in each subset into the third neural network, to obtain score information; and determine, based on the score information, the weight information of the third neural network by using a loss function based on statistical probability distribution through gradient descent backpropagation.

Further, the processing module 1301 is configured to:

construct, by using a preset traversal algorithm, a new first neural network based on an indicator value obtained after validation.

Figure 14:
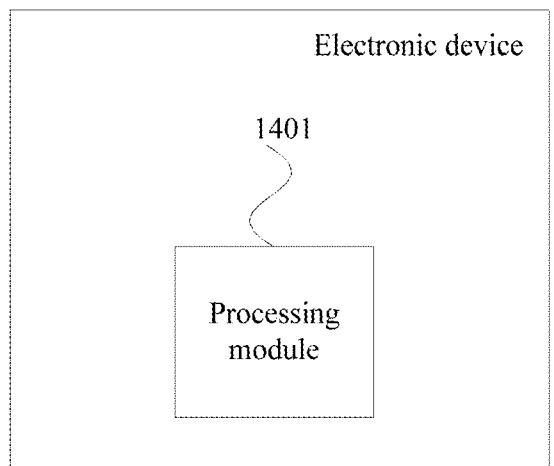
FIG. 14 is a module structure diagram of another electronic device according to this application.

FIG. 14 is a module structure diagram of another electronic device according to this application. As shown in FIG. 14, the electronic device includes a processing module 1401, configured to:

obtain a target scoring model based on a preset image aesthetic scoring model, at least one preset quality discrimination model, and a preset downgrade policy; and perform score downgrade processing on an image based on the target scoring model.

Further, the processing module 1401 is specifically configured to:

integrate the image aesthetic scoring model with the at least one quality discrimination model, and perform downgrade processing on an output of an integrated model by using the preset downgrade policy, to obtain the target scoring model.

Further, the downgrade policy includes at least one of the following:

a first downgrade policy, where in the first downgrade policy, there is a first preset correspondence between a low-quality factor affecting an image score and the image score;

a second downgrade policy, where in the second downgrade policy, there is a second preset correspondence between a low-quality factor affecting an image score and an image score decrease proportion; and a third downgrade policy, where in the third downgrade policy, a low-quality image is used as training data to obtain a downgrade function between the image aesthetic scoring model and the quality discrimination model.

Further, the target scoring model is applied to the electronic device, the electronic device includes a dual execution environment, and the image aesthetic scoring model runs in a trusted execution environment of the dual execution environment.

Figure 15:
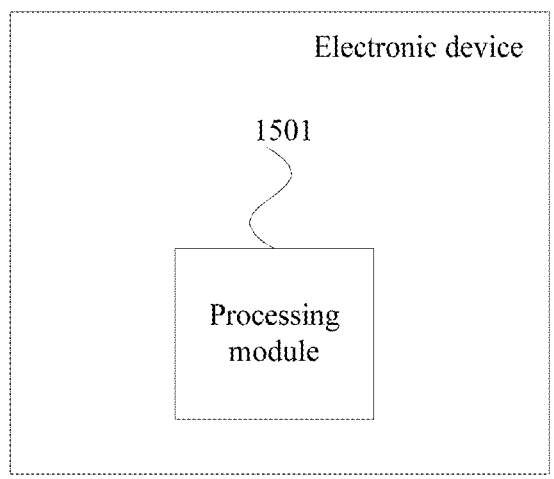
FIG. 15 is a module structure diagram of still another electronic device according to this application.
Figure 1:
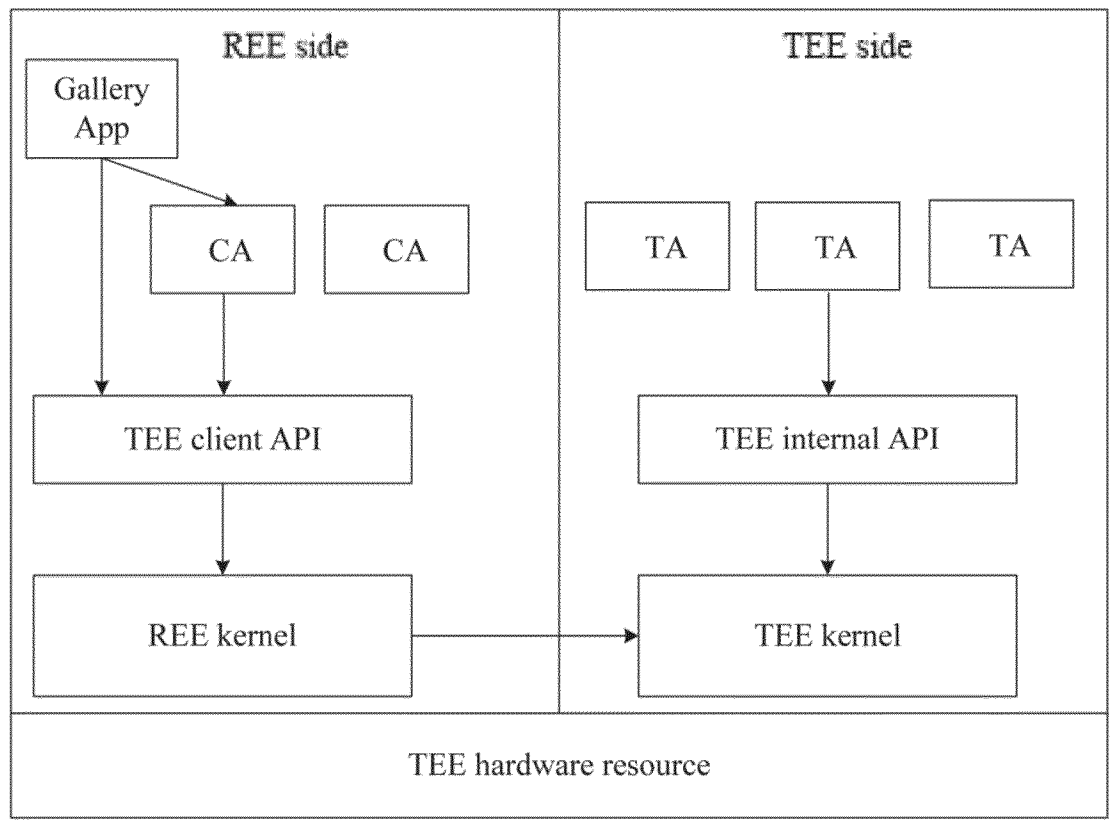
Figure 2:
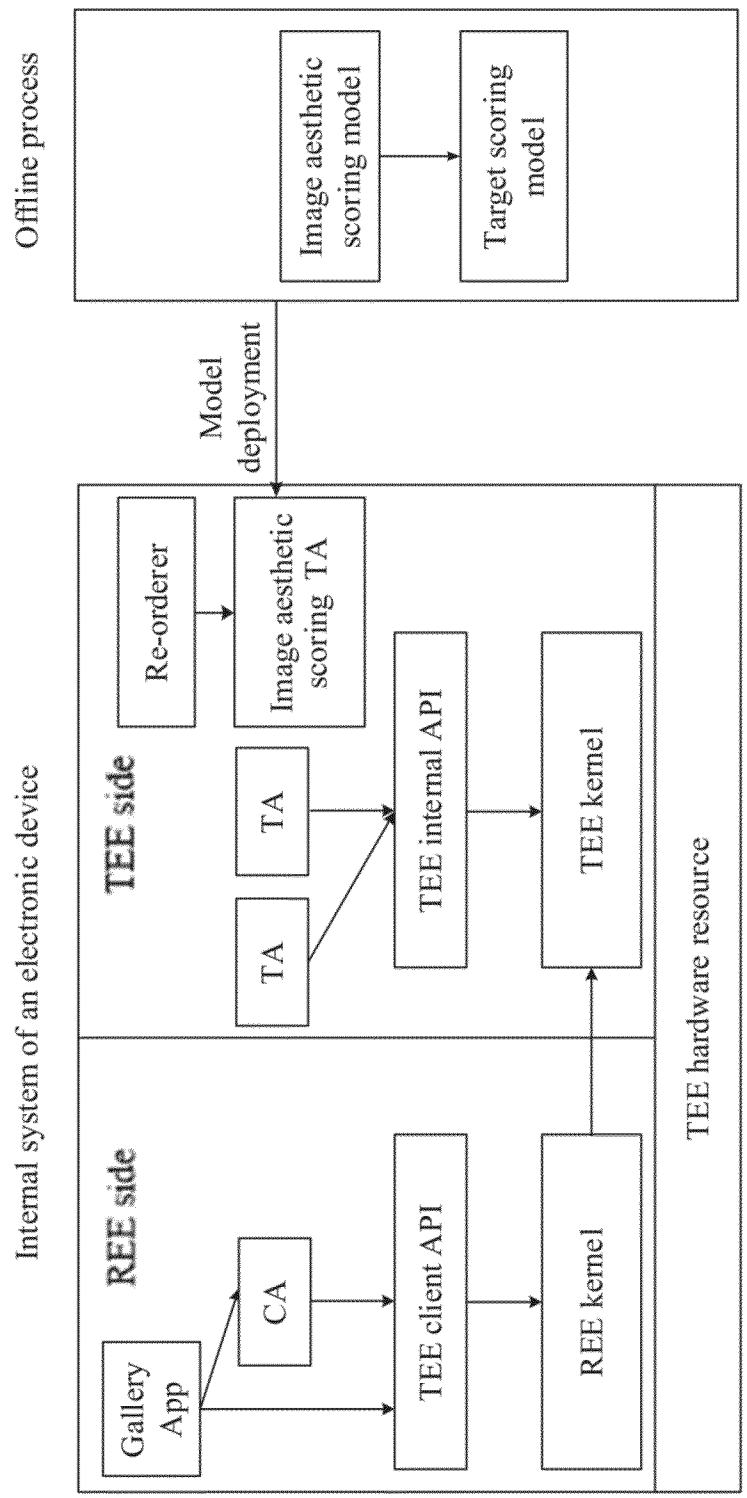

FIG. 15 is a module structure diagram of still another electronic device according to this application. As shown in FIG. 15, the electronic device includes a processing module 1501, configured to:

obtain a to-be-ordered image set, where each image in the to-be-ordered image set includes score information; and order the to-be-ordered image set based on a preset re-ordering model, to obtain an ordered image set, where the re-ordering model is constructed based on a reinforcement learning framework, the re-ordering model is used to feed back feature information of a user, and the reinforcement learning framework includes a state and a reward.

Further, the processing module 1501 is specifically configured to:

train the re-ordering model based on user information and the score information, where the user information is obtained based on a user operation, and the user operation includes operation content, an operation sequence, and operation time.

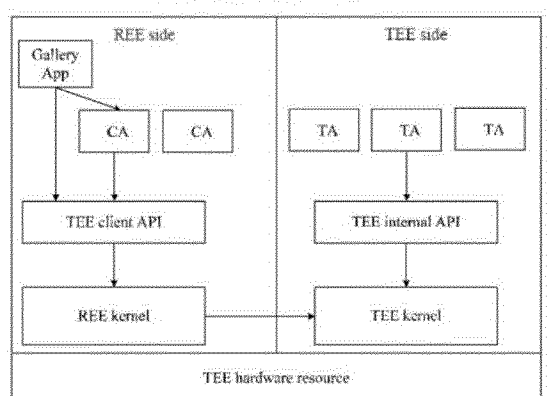

What is claimed is:

1. A method for generating an image aesthetic scoring model, comprising:
constructing a first neural network based on a preset convolutional structure set;
obtaining an image classification neural network, wherein the image classification neural network is used to classify image scenarios;
obtaining a second neural network based on the first neural network and the image classification neural network, wherein the second neural network is a neural network containing scenario information; and
determining an image aesthetic scoring model based on the second neural network, wherein output information of the image aesthetic scoring model comprises image scenario classification information,
wherein the determining of the image aesthetic scoring model comprises:
adding a loss function calculation layer to the second neural network, to obtain a third neural network;
training the third neural network based on a preset training data set, to determine weight information of the third neural network; and
validating the third neural network based on a preset validation data set, to determine the image aesthetic scoring model.

2. The method according to claim 1, wherein the image aesthetic scoring model is applied to an electronic device, the electronic device comprises a dual execution environment, and the image aesthetic scoring model runs in a trusted execution environment of the dual execution environment.

3. The method according to claim 1, wherein the obtaining of the second neural network comprises concatenating the first neural network with the image classification neural network.

4. The method according to claim 1, wherein the obtaining of the second neural network comprises performing parameter sharing between the first neural network and the image classification neural network.

5. The method according to claim 1, wherein the loss function calculation layer comprises a plurality of classifiers, each of the classifiers corresponding to a score, and each of the classifiers being used to determine a relationship between an image score and the score corresponding to the classifier.

6. The method according to claim 1, wherein the loss calculation layer includes a cross-entropy loss function and a class center loss function.

7. The method according to claim 1, wherein the preset training data set comprises at least one of a first training data set including a plurality of images, each of the images in the first training data set including score information, a second training data set including a plurality of images, each of the images in the second training data set including score ranking information of the respective image in the second training data set.

8. The method according to claim 7, wherein the training of the third neural network comprises inputting the images in the first training data set into the third neural network one by one.

9. The method according to claim 7, wherein the training of the third neural network comprises:
dividing the images in the second training data set into a plurality of image pairs, and inputting two images in each image pair into the third neural network and into a neural network replicated from the third neural network, respectively; and
performing loss calculation based on scores and score ranking information of the two images, to determine the weight information of the third neural network.

10. The method according to claim 7, wherein the training of the third neural network comprises:
dividing the images in the second training data set into a plurality of subsets, and inputting an image in each subset into the third neural network, to obtain score information; and
determining, based on the score information, the weight information of the third neural network by using a loss function based on statistical probability distribution through gradient descent backpropagation.

11. The method according to claim 1, wherein after the validating of the third neural network, the method further comprises constructing, by using a preset traversal algorithm, a new first neural network based on an indicator value obtained after validation.

12. An electronic device, comprising:
at least one processor; and
a memory coupled to the at least one processor and configured to store programming instructions that, when executed by the at least one processor, cause the at least one processor to perform operations comprising:
constructing a first neural network based on a preset convolutional structure set;
obtaining an image classification neural network, wherein the image classification neural network is used to classify image scenarios;
obtaining a second neural network based on the first neural network and the image classification neural network, wherein the second neural network is a neural network containing scenario information; and
determining an image aesthetic scoring model based on the second neural network, wherein output information of the image aesthetic scoring model comprises image scenario classification information,
wherein the determining of the image aesthetic scoring model by the at least one processor comprises:
adding a loss function calculation layer to the second neural network, to obtain a third neural network;
training the third neural network based on a preset training data set, to determine weight information of the third neural network; and
validating the third neural network based on a preset validation data set, to determine the image aesthetic scoring model.

13. The electronic device according to claim 12, wherein the image aesthetic scoring model is applied to the electronic device, the electronic device comprises a dual execution environment, and the image aesthetic scoring model runs in a trusted execution environment of the dual execution environment.

14. The electronic device according to claim 12, wherein the obtaining of the second neural network by the at least one processor comprises concatenating the first neural network with the image classification neural network.

15. The electronic device according to claim 12, wherein the obtaining of the second neural network by the at least one processor comprises performing parameter sharing between the first neural network and the image classification neural network.

16. The electronic device according to claim 12, wherein the loss function calculation layer comprises a plurality of classifiers, each of the classifiers corresponding to a score, and each of the classifiers being used to determine a relationship between an image score and the score corresponding to the classifier.

17. The electronic device according to claim 12, wherein the preset training data set comprises at least one of a first training data set including a plurality of images, each of the images in the first training data set including score information, and a second training data set including a plurality of images, each of the images in the second training data set including score ranking information of the respective image in the second training data set.

18. A non-transitory computer-readable storage medium for storing one or more programming instructions that, when executed by an electronic device, cause the electronic device to perform the steps of:
    constructing a first neural network based on a preset convolutional structure set;
    obtaining an image classification neural network, wherein the image classification neural network is used to classify image scenarios;
    obtaining a second neural network based on the first neural network and the image classification neural network, wherein the second neural network is a neural network containing scenario information; and
    determining an image aesthetic scoring model based on the second neural network, wherein output information of the image aesthetic scoring model comprises image scenario classification information,
    wherein the determining of the image aesthetic scoring model comprises:
    adding a loss function calculation layer to the second neural network, to obtain a third neural network;
    training the third neural network based on a preset training data set, to determine weight information of the third neural network; and
    validating the third neural network based on a preset validation data set, to determine the image aesthetic scoring model.

* * * * *

UNITED STATES PATENT AND TRADEMARK OFFICE
CERTIFICATE OF CORRECTION

PATENT NO. : 11,314,988 B2
APPLICATION NO. : 16/771063
DATED : April 26, 2022
INVENTOR(S) : Qing Zhang et al.

It is certified that error appears in the above-identified patent and that said Letters Patent is hereby corrected as shown below:

On the Title Page

Please delete the Title Page and insert the Title Page showing the illustrative figure shown on the attached Title Page.

In the Drawings

Please replace Figs. 1, 2 with Figs. 1, 2 as shown on the attached pages.

Signed and Sealed this
Second Day of August, 2022

Katherine Kelly Vidal
*Director of the United States Patent and Trademark Office*

(12) United States Patent
Zhang et al.

(10) Patent No.: US 11,314,988 B2
(45) Date of Patent: Apr. 26, 2022

(54) IMAGE AESTHETIC PROCESSING METHOD AND ELECTRONIC DEVICE

(71) Applicant: HUAWEI TECHNOLOGIES CO., LTD., Guangdong (CN)

(72) Inventors: Qing Zhang, Beijing (CN); Miao Xie, Shenzhen (CN); Shangling Jui, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 73 days.

(21) Appl. No.: 16/771,063

(22) PCT Filed: Mar. 26, 2018

(86) PCT No.: PCT/CN2018/080533
§ 371 (c)(1),
(2) Date: Jun. 9, 2020

(87) PCT Pub. No.: WO2019/114147
PCT Pub. Date: Jun. 20, 2019

(65) Prior Publication Data
US 2021/0182613 A1 Jun. 17, 2021

(30) Foreign Application Priority Data
Dec. 15, 2017 (CN) .......................... 201711351283.4

(51) Int. Cl.
*G06K 9/62* (2006.01)
*G06N 3/04* (2006.01)
(Continued)

(52) U.S. Cl.
CPC ......... *G06K 9/6257* (2013.01); *G06K 9/6262* (2013.01); *G06K 9/6267* (2013.01);
(Continued)

(58) Field of Classification Search
CPC .. H04L 63/0823; H04L 63/083; H04L 67/141; H04W 12/068; H04W 12/069;
(Continued)

(56) References Cited

U.S. PATENT DOCUMENTS 9,659,384 B2 5/2017 Shaji et al.
2016/0098844 A1* 4/2016 Shaji ..................... G06T 9/00
382/156
(Continued)

FOREIGN PATENT DOCUMENTS

CN 104333707 A 2/2015
CN 105787510 A 7/2016
(Continued)

OTHER PUBLICATIONS

Shu Kong et al., "Photo Aesthetics Ranking Network with Attributes and Content Adaptation", dated Jul. 27, 2016, total 24 pages.
(Continued)

*Primary Examiner* — Xin Jia
(74) *Attorney, Agent, or Firm* — Westerman, Hattori, Daniels & Adrian, LLP

(57) ABSTRACT

This application provides an image aesthetic processing method and an electronic device. A method for generating an image aesthetic scoring model includes: constructing a first neural network based on a preset convolutional structure set; obtaining an image classification neural network, where the image classification neural network is used to classify image scenarios; obtaining a second neural network based on the first neural network and the image classification neural network, where the second neural network is a neural network containing scenario information; and determining an image aesthetic scoring model based on the second neural network, where output information of the image aesthetic scoring model includes image scenario classification infor-
(Continued)